Patented Aug. 19, 1947

UNITED STATES PATENT OFFICE 2,425,766

UNSATURATED ALKYL ESTERS OF ALKENYL PHOSPHONIC ACIDS

Arthur Dock Fon Toy, Chicago, Ill., assignor to Victor Chemical Works, a corporation of Illinois No Drawing. Application October 29, 1945, Serial No. 625,460

4 Claims. (Cl. 260—461)

This invention relates to a new class of unsaturated alkyl esters of alkenyl phosphonic acids having the general formula

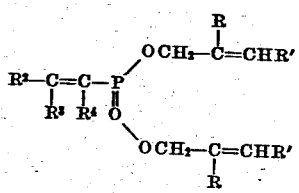

wherein R, R', and $R^4$ represent hydrogen and alkyl radicals, and $R^2$ and $R^3$ represent hydrogen, alkyl, and aryl radicals. The new ester compounds may be prepared by reacting an alpha, beta unsaturated alkyl phosphorus oxydichloride with a beta, gamma unsaturated alkyl alcohol under esterifying reaction conditions.

The alpha, beta unsaturated alkyl phosphorus oxydichloride reactant may be prepared by the method described by W. H. Woodstock in U. S. patent application Serial No. 590,956 (filed 4/28/45) where $R^4$ in the above formula is hydrogen. This method comprises forming an olefin-phosphorus pentachloride addition compound and then reacting the addition compound with phosphorus pentoxide in accordance with the following reactions:

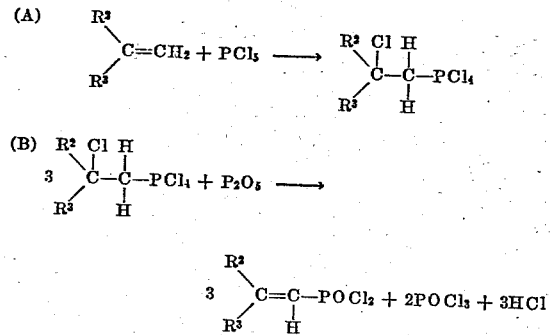

In the case where $R^4$ is an alkyl radical, the alkenyl phosphorus oxydichloride compound may be prepared by the method of L. A. Hamilton described in U. S. Patent 2,365,466, which comprises dehydrating a phosphonic acid containing a hydroxyl group attached to the carbon to which the phosphorus atom is attached, and reacting the dehydrated product with phosphorus pentachloride to obtain the oxydichloride compound.

The beta, gamma unsaturated alkyl alcohols suitable for use in making the products of the present invention may be designated by the general formula

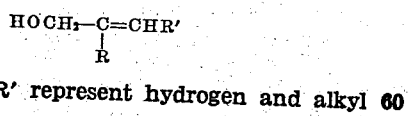

where R and R' represent hydrogen and alkyl hydrocarbon radicals. Typical alcohols of this type are allyl, methallyl, and crotonyl alcohols.

The products of the present invention are clear liquid ester compounds which are suitable for use as plasticizers and modifying agents for a number of commercial type resins and plastics. They impart fireproofing characteristics to such resin products, and may also be employed as organic solvents. They may under suitable conditions be polymerized to give satisfactory clear resin products.

The new beta, gamma unsaturated alkyl esters of the alkenyl phosphonic acids may be prepared by reacting the sodium alcoholates of the unsaturated alcohol with the alkenyl phosphorus oxydichlorides, but such procedure is difficult to carry out and the yields are poor. It has been found, however, that greatly improved yields and better products may be obtained by reacting the beta, gamma unsaturated alcohols with the alkenyl phosphorus oxydichloride in the presence of pyridine with or without an inert solvent such as benzene, hexane, etc.

The following examples illustrate my improved method of production:

Example 1

Diallyl iso-butenylphosphonate was prepared as follows: 173 g. (1 mole) of isobutenyl phosphorus oxydichloride was slowly added to a solution of 166 g. (2.1 moles) of pyridine and 122 g. (2.1 moles) of allyl alcohol in 440 g. of hexane. The addition was carried out with cooling and continuous stirring at a temperature of approximately 2° to 5° C. Upon completion of the addition, the mixture was allowed to stand with stirring at room temperature for one hour, and then the pyridine hydrochloride precipitate was removed by filtration. The filtrate was distilled under 200 mm. pressure below 35° C. to remove the hexane solvent. The oily residue was washed with several small portions of a 3% caustic soda solution and water to remove any free acidity. The washed oil was dried and the ester product distilled off under vacuum. The ester product was a colorless oil with a boiling range of 110–115° C. at 3–4 mm. pressure and a refractive index of 1.4666 at 26° C. The yield was 137 g. which was 61.8% of theoretical. The reaction involved was substantially in accord with the equation

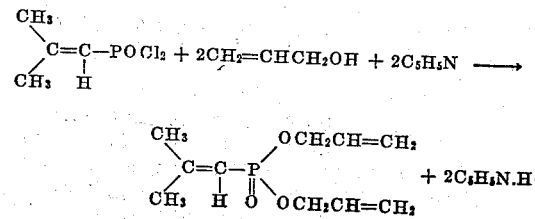

The phosphorus content of the ester was 14.4% compared to the calculated value of 14.35%.

Example 2

Diallyl isooctenylphosphonate was prepared by reacting 183 g. (0.8 mole) of isooctenyl phosphorus oxydichloride with 93 g. (1.6 moles) of allyl alcohol and 126.5 g. (1.6 moles) of pyridine in accordance with the procedure of Example 1. 169 grams of the distilled ester product was obtained representing a yield of 62.2%. The ester was a colorless oil with a boiling point of 135°–140° C. at 3 to 4 mm. pressure and a refractive index of 1.4662 at 26° C. The reaction involved was substantially in accord with the equation:

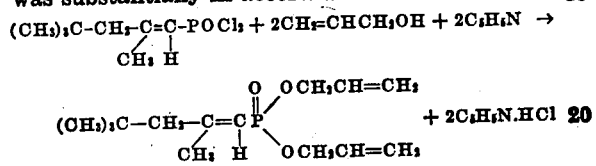

Analysis of the ester showed 11.4% phosphorus content which corresponds to the calculated phosphorus content.

Example 3

Diallyl styrylphosphonate was prepared as follows: 221 g. (1 mole) of styryl phosphorus oxydichloride dissolved in 200 cc. of benzene was slowly added to a solution of 116 g. (2 moles) of allyl alcohol and 158 g. (2 moles) of pyridine in 300 cc. of benzene. The reaction temperature was maintained at about 2° to 5° C. with an ice-salt bath. Upon completion of the reaction the mixture was allowed to stand at room temperature for an hour and then the pyridine hydrochloride precipitate was removed by filtration. The filtrate was distilled below 30° C. at a pressure of less than 100 mm. to remove the benzene solvent. The residue was washed with 25 cc. portions of a 3% caustic soda solution containing 17.5% salt until the washings are slightly alkaline to methyl orange. The washed oil was dried and distilled carefully under reduced pressure in the presence of a small amount of copper powder as a polymerization inhibitor. The distilled ester product was a colorless oil having a boiling point of 152° to 158° C. at 1 mm. pressure, and a refractive index of 1.5442 at 26° C. The yield was 134 g. representing 50.5% of theoretical. (The low yield plus the fact that a considerable amount of jelly-like residue remained in the still indicates that partial polymerization had occurred.) The reaction involved was substantially in accord with the equation:

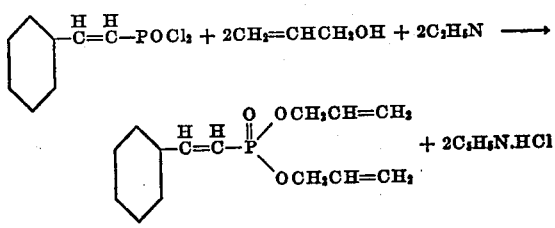

Analysis of the ester showed 11.92% P compared to the calculated value of 11.75%.

Example 4

Dimethallyl isobutenylphosphonate was prepared in the following manner: 294 g. (4.08 moles) of methallyl alcohol and 332 g. (4.2 moles) of pyridine were placed in a reaction flask equipped with thermometer and stirrer. To this mixture was added over a period of several hours 346 g. (2 moles) of isobutenyl phosphorus oxydichloride with stirring while maintaining a temperature of approximately 2° to 5° C. by means of an ice-salt bath. After completing the addition, the reaction mixture was allowed to come to room temperature. 200 cc. of water was then added to dissolve and separate the pyridine hydrochloride from the oily ester product. After separating the oily layer, it was washed with a 3% caustic soda solution and several portions of water to remove all traces of acidity. The oil was then dried and purified by distillation under vacuum. 295 grams of the ester compound was obtained, representing a yield of 60.2% of theoretical. The ester product was a colorless oil having a boiling range of 110° to 120° C. at 1 to 2 mm. pressure, and a refractive index of 1.4667 at 26° C. Analysis showed a 12.6% phosphorus content compared to the calculated value of 12.7% for the formula

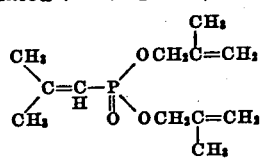

Example 5

Dimethallyl isooctenylphosphonate was prepared in accordance with the procedure of Example 4, using the following reactants: 288 g. (4 moles) of methallyl alcohol, 332 g. (4.2 moles) of pyridine, and 458 g. (2 moles) of isooctenyl phosphorus oxydichloride. The distilled ester product was a colorless oil having a boiling range of 110 to 122° C. at 1 mm. pressure, and a refractive index of 1.4668 at 24° C. The ester product weighed 450 g., representing a yield of 74.8%. Analysis showed a 10.7% phosphorus content compared to the calculated value of 10.3% for the formula

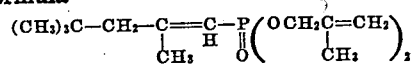

Example 6

Dimethallyl styrylphosphonate was prepared by following the procedure of Example 3, using methallyl alcohol instead of allyl alcohol. The ester product which was distilled over at 158–164° C. at 2 mm. pressure was a colorless oily liquid which could not be redistilled without some decomposition or partial polymerization. The product is quite useful in a partially polymerized state as a plasticizing and modifying agent for many resin and plastic compositions. The liquid ester had a refractive index of 1.5391 at 25° C. and a phosphorus content of 10.3% compared to the calculated value of 10.6% for the formula

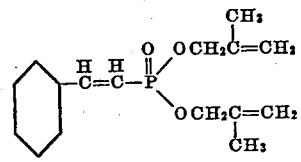

The beta, gamma unsaturated alkyl esters of the alkenyl phosphonic acids tend to decompose or become partially polymerized at temperatures near their boiling points. Very low pressures must be employed making distillations to prevent very poor yields. Polymerization inhibitors such as finely divided copper, bronze, copper compounds, etc., may be added during distillations to improve the yield of monomeric esters The proportions employed in the above examples are not critical with respect to the use of excess amounts of the alcohol and pyridine. Excesses of either the alcohol or pyridine may be separated and recovered after the ester forming reaction is completed.

The pyridine hydrochloride separated in the above examples may be reconverted by known means to pyridine for reuse in the process.

The ester forming reactions in the above examples were carried out at temperatures sufficiently low to avoid decomposition of the unsaturated alcohols by HCl liberated in the reaction prior to its absorption by the pyridine. Generally a temperature of the order of 10° C. will be satisfactory though a temperature of less than 5° C. is preferred.

The foregoing detailed description is given for clearness of understanding only, and no unnecessary limitations should be understood therefrom, for some modifications will be obvious to those skilled in the art.

What I claim as new, and desire to secure by Letters Patent, is:

1. A new composition of matter diallyl isobutenylphosphonate.
2. A new composition of matter diallyl styrylphosphonate.
3. A new composition of matter dimethallyl isooctenylphosphonate.
4. A new product, a beta, gamma unsaturated alkyl diester of an alpha, beta unsaturated alkenyl phosphonic acid.

ARTHUR DOCK FON TOY.

REFERENCES CITED

The following references are of record in the file of this patent:

UNITED STATES PATENTS

| Number | Name | Date |
|---|---|---|
| 2,365,466 | Hamilton | Dec. 19, 1944 |
| 2,226,552 | Conary | Dec. 31, 1940 |
| 1,785,951 | Gibson | Dec. 23, 1930 |
| 2,137,792 | Woodstock | Nov. 22, 1938 |
| 2,389,576 | Kosalopoff | Nov. 20, 1945 |
| 2,249,768 | Kropa | July 22, 1941 |

FOREIGN PATENTS

| Number | Country | Date |
|---|---|---|
| 517,538 | Germany | Feb. 13, 1931 |